Aug. 8, 1939.   A. W. TRONNIER ET AL   2,169,130
MAGNIFYING LENS ATTACHMENT FOR OBJECTIVES
Filed Sept. 7, 1937

Patented Aug. 8, 1939

2,169,130

UNITED STATES PATENT OFFICE 2,169,130

MAGNIFYING LENS ATTACHMENT FOR OBJECTIVES

Albrecht Wilhelm Tronnier, Gottingen, Stefan Roeschlein, Bad Kreuznach, and Edmund Lescher, Gottingen, Germany, assignors to Jos. Schneider & Co. Optische Werke, Bad Kreuznach, Germany, a firm of Germany Application September 7, 1937, Serial No. 162,752
In Germany May 4, 1937

5 Claims. (Cl. 88—57)

The invention relates to a magnifying lens system having fixed magnification for attachment in front of the objectives of photographic and cinematographic cameras and which therefore serves for altering the size of the image produced by the objective and can be either removably or permanently connected therewith by suitable means such as a screw connection or bayonet joint, the actual magnifying lens system consisting of two or more air spaced elements.

The object of increasing or altering the size of the image produced by a photographic objective by the lens system according to the present invention is to enable the objective to be used for other than normal conditions while maintaining the same distance between the objective and image and thus with the same extension of the camera, without, however, involving the necessity of changing any individual elements of the photographic objective, which may therefore be incorporated permanently in a roll film or cinema film camera.

Hitherto such enlargement as is obtained by the new auxiliary lens system in conjunction with the photographic objective of the camera was obtained either only by the use of a special tele-objective, which was substituted for the normal objective and thus could be employed only in cameras having detachable objectives, or else it was necessary to change some of the elements of the objective.

Auxiliary lenses are also known for modifying the focal length of optical photographic systems, for example, for increasing the focal length, but these lenses also modify the image distance at the same time, that is, the distance of the image plane from the nearest surface of the objective, so that the use of such auxiliary lenses always necessitated an extensible camera arrangement, which is technically difficult to produce in the case of roll film and cinema cameras and would moreover greatly increase the difficulty of manipulating such a camera.

To carry out the idea underlying the present invention, namely to obtain an increased magnification with a photographic objective of normal construction without altering the image distance merely by positioning the auxiliary lens system in front of the objective, it is necessary to comply with the condition that the auxiliary lens system positioned in front of the photographic objective be constructed as a telescopic system and, in contradistinction to telescope lens systems that it be corrected spherically, chromatically, comatically and astigmatically. As, moreover, the light-collecting power of the photographic objective should be maintained without substantial alteration, the front element of the auxiliary lens system in particular must have an extremely large relative aperture which can rise to f.1 if, for example, the auxiliary system is to be employed in conjunction with a photographic system of very great light-collecting power, for example greater than f.2. Consequently the surface curvatures must have a suitable relationship to the diameters so that for such extreme apertures there is an adequately favorable angle of passage for the rays forming the image so that the image error correction can be effected.

Apart from this, from general constructional and optical considerations, the auxiliary system must have as small a length as possible. From structural considerations this has the result that the system is of small dimensions and of small weight and thus can be readily carried and conveniently handled in actual use, while from optical considerations the result is obtained that there is no appreciable decrease in luminosity towards the edges of the image field which is to be covered. The overall length of the magnifying frontal lens system should not be greater than 130% of the diameter of the front lens.

Apart from this, it must in any event be taken into account that in the combination of the auxiliary system with the photographic objective, it is necessary to correct coma and astigmatism over a very large image field. Moreover, a particularly good chromatic total correction may be necessary, more particularly in order to render the auxiliary system suitable for use also with the Fischer color film process (Agfa chrome and Kodak chrome) in order that there should be no color effect and thus no falsification of color at the edges of contrasts. For the last mentioned reason it is advisable to incorporate in one of the elements of the auxiliary system a cemented surface giving a suitably definite color correction.

To completely satisfy this and other requirements it has been found particularly advantageous to employ for the new attachment a lens construction which is a development of the known Gauss lens, that is, it is composed primarily of a collecting and a dispersing portion, these portions having the form of a meniscus and having surfaces which are convex on the side adjacent the object, the dispersing outer surface in the last portion being so strongly curved that the rays emerge from the attachment system parallel to their direction of entry in contradistinction to the normal Gauss objective of finite focal length in which the parallel incident rays leave the system with a finite angle of convergence.

If the new attachment is to be employed with photographic objectives of very high light collecting capacity, for example, with a relative aperture of materially greater than f. 3.5, or if large magnifications are required, then the construction of the system from two air spaced members is preferably augmented to a three-element system, the three elements of which are separated by two air gaps, the dispersing surface of considerable curvature being provided on a separate air spaced lens.

Thus an important novel characteristic of the lens system according to the present invention is that on the side adjacent the photographic objective the magnifying attachment system is bounded by the said surface giving considerable dispersion, whereas on the other side, associated with the longer conjugate distance of the entire combination, that is, the side facing the object, there is an air spaced collecting element as well as a following collecting surface which is separated from the said collecting element by an air gap, the radius of this collecting surface being greater than 30 per cent but smaller than 130 per cent of the diameter of the collecting front element and at the same time the focal length of the said collecting surface $$\left(f_{0_s} = \frac{R_s}{n-1}\right)$$

is at least ⅕ but at the most ⅘ of the focal length of the front lens and in addition the radius of the dispersing outer surface of the lens system which is adjacent the photographic objective is greater than 30 per cent but less than 130 per cent of the radius of the collecting surface following the front lens. At the same time the two outer surfaces of the air spaced front element which is on the side adjacent the object and associated with the longer conjugate distance of the total combination as well as the collecting surface following this front lens preferably have a curvature of the same algebraic sign as the dispersing surface of the attachment system which is adjacent the photographic objective.

Further constructional features of an arrangement according to the invention are set out below with reference to numerical examples.

Three constructions of the new attachment are illustrated diagrammatically in the accompanying drawing, in which Fig. 1 shows an attachment according to the invention consisting of two air spaced elements designed for use with an objective having a focal length of f=52.5 mm. and for an image size of 24.36 mm².

Figure 3:
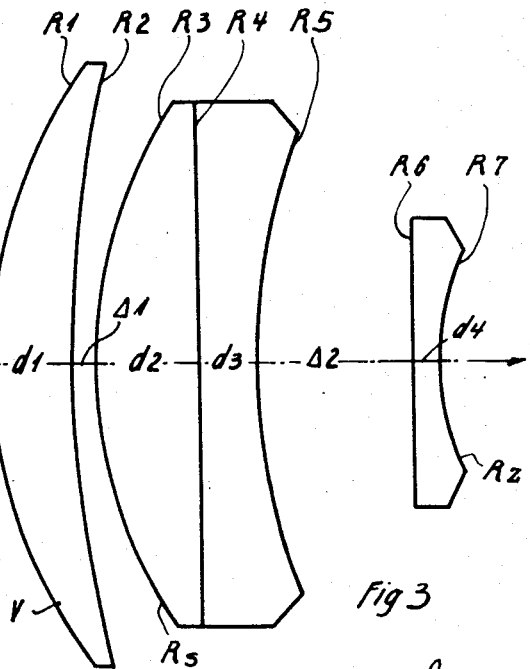

Fig. 3 shows a system in accordance with the invention consisting of three air spaced members also shown on twice the natural scale, this arrangement being particularly suitable for use with a 16 mm. color film when employing the Berthon process. In accordance with the particular external requirements which have to be taken into account in this process with respect to the position of the color filter and the production of the pupils free from shadow, the front lens is particularly strongly curved and the diameters of the lenses are considerably larger than in the two other examples.

Figure 1:
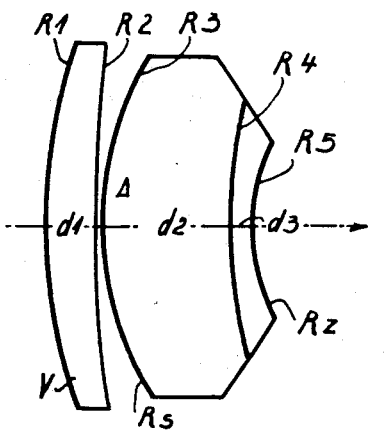
Fig. 1a shows a system according to Fig. 1 in its actual dimensions positioned in front of an objective having a relative aperture of f. 3.5 and comprising three air spaced members as specified above.
Figure 1A:
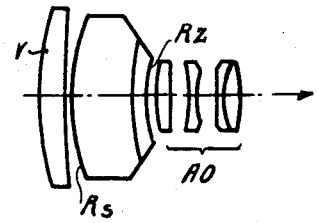

The attachment system according to Fig. 1 when used with the photographic objective AO as explained above and as shown in Fig. 1a gives an increase in the focal length from f=5.25 cm. to f=7.5 cm. so that the size of the image is increased by the factor 1.4.

Figure 2:
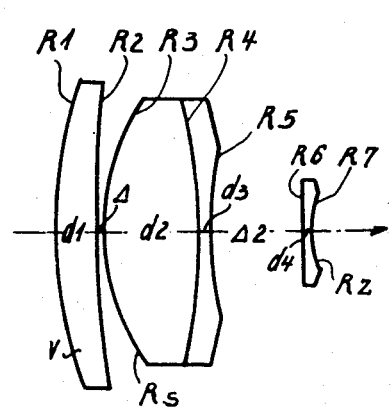
Fig. 2 shows a system according to the invention consisting of three air spaced members computed for use with a photographic objective of focal length f=13 mm. and with a relative aperture of f. 1.5 for use with an 8 mm. film, the lens system being shown twice the natural size.

The system of Fig. 2 is intended more particularly as an attachment for objectives of very high light-collecting power and in the example chosen the objective has a relative aperture of f. 1.5, the focal length being increased from f=13 mm. to f=26 mm., while maintaining the relative aperture, the size of the image thus being increased by the factor 2.

The reference numerals employed in the drawing correspond to those given in the numerical examples set out below. Moreover in the drawing, V indicates the front element of the system on the side associated with the longer conjugate distance, $R_s$ indicates the above-mentioned collecting surface and $R_z$ the dispersing outer surface.

Thus in Fig. 1 the surface R3 indicates the collecting surface $R_s$ following the front lens V, whereas the outer surface R5 which is adjacent the photographic objective represents the dispersing surface $R_z$.

In Fig. 2 the surface R3 following the front lens V is again the collecting surface $R_s$, whereas in this embodiment the dispersing surface $R_z$ adjacent the photographic objective is in this embodiment constituted by the surface R7.

In the third embodiment according to Fig. 3 the identification of the surfaces corresponds to that in Fig. 2, that is, the surface R3, constitutes the collecting surface $R_s$ and the surface R7 constitutes the dispersing surface $R_z$.

The refractive indices given in the numerical examples correspond to the green ray, whereas the color dispersion of the glass employed is characterised by the Abbe number $\mu$. The lens diameters $\phi$ are also given in mm.

*Example I*

$f_{0_s} = +50.61 \quad f_s = +137.17$ $R_1 = +50.00$
    $d_1 = 5.13 \quad n_{e1}=1.51804 \quad \nu_1=64.0 \quad \phi 35.5$
$R_2 = +162.71$
    $\Delta = 0.10$
$R_3 = +30.89$
    $d_2 = 12.50 \quad n_{e2}=1.61022 \quad \nu_2=49.2 \quad \phi 32.5$
$R_4 = +46.55$
    $d_3 = 2.08 \quad n_{e3}=1.67187 \quad \nu_3=41.9$
$R_5 = +17.84$

*Example II*

$f_{0_s} = +35.71 \quad f_s = +114.76$ $R_1 = +41.83$
    $d_1=4.36 \quad n_{e1}=1.51804 \quad \nu_1=64.0 \quad \phi 30.0$
$R_2 = +136.11$
    $\Delta_1 = 0.01$
$R_3 = +21.87$
    $d_2=9.58 \quad n_{e2}=1.61258 \quad \nu_2=58.9 \quad \left\{\begin{array}{l}26.0\\ \phi\\ 26.0\end{array}\right.$
$R_4 = -105.12$
    $d_3=0.87 \quad n_{e3}=1.61725 \quad \nu_3=37.0$
$R_5 = +38.94$
    $\Delta_2 = 9.03$
$R_6 = +57.88$
    $d_4=0.87 \quad n_{e4}=1.58604 \quad \nu_4=46.5 \quad \phi 10.0$
$R_7 = +10.00$

Example III $f_{o_a} = +77.68 \quad f_V = +130.04$ $R_1 = +50.00$
$\quad d_1 = 7.58 \quad n_{e1} = 1.62262 \quad \nu_1 = 60.2 \quad \phi 59.5$
$R_2 = +123.13$
$\quad \Delta_1 = 2.27$
$R_3 = +47.01$
$\quad d_2 = 9.86 \quad n_{e2} = 1.60519 \quad \nu_2 = 60.7 \quad \phi \begin{cases} 51.5 \\ 51.5 \end{cases}$
$R_4 = +303.28$
$\quad d_3 = 6.06 \quad n_{e3} = 1.60620 \quad \nu_3 = 42.5$
$R_5 = +60.66$
$\quad \Delta_2 = 15.15$
$R_6 = +303.28$
$\quad d_4 = 3.03 \quad n_{e4} = 1.58592 \quad \nu_4 = 40.8 \quad \phi 28.0$
$R_7 = +22.75$

We claim:

1. In a magnifying frontal attachment lens system adapted to be positioned in axial alignment with photographic and cinematographic camera objectives, for enlarging the image scale of the objective with substantially unchanged image distance and having a collective lens toward the object, a dispersive lens toward the image in axial alignment with the collective lens, and in which said lenses are meniscus-shaped and have convex surfaces toward the object, and which lenses, in their combination, are corrected spherically, chromatically, comatically and astigmatically; the frontal lens system having on its side directed toward the objective a strongly curved surface having a powerful dispersing action, and having on the side directed toward the object an air-spaced collecting front lens having an extremely large relative aperture, and said system having a collecting surface following and separated from the front lens by a small air gap, whose radius is more than 30% but less than 130% of the diameter of the collecting front lens and whose surface focal length is at least ⅕ and at most ⅘ of the focal length of the front lens, the radius of curvature of the strongly curved surface of the system directed toward the objective being more than 30% but less than 130% of the radial length of the collecting surface following the front lens and such that the emergent rays are parallel to their direction of entry, the overall length of the frontal system being less than 130% of the diameter of the front lens.

2. A frontal attachment lens system according to claim 1 and in which the two air-spaced outer surfaces of the front lens directed toward the object like the collecting surface following this front lens, have the same algebraic curvature signs as the dispersing outer radius of the frontal system directed toward the objective.

3. A frontal attachment lens system according to claim 1 and in which the lens having the dispersing outer radius is separated from the lens having the collecting surface by an air gap.

4. A frontal attachment lens system according to claim 1 in which one of the lens members is assembled of lenses cemented to each other, the glasses of which have different optical properties and have surfaces cemented together having a radius which is not smaller than that of the dispersing outer surface.

5. A frontal attachment lens system according to claim 1 and in which the front lens of the system, farthest away from the camera objective, is a single lens.

ALBRECHT WILHELM TRONNIER.
STEFAN ROESCHLEIN.
EDMUND LESCHER.